United States Patent
McConnell (10) Patent No.: US 7,815,106 B1
(45) Date of Patent: Oct. 19, 2010

(54) MULTIDIMENSIONAL TRANSACTION FRAUD DETECTION SYSTEM AND METHOD

(75) Inventor: James Trent McConnell, Keller, TX (US)

(73) Assignee: Verizon Corporate Services Group Inc., Basking Ridge, NJ (US)

( * ) Notice: Subject to any disclaimer, the term of this patent is extended or adjusted under 35 U.S.C. 154(b) by 263 days.

(21) Appl. No.: 11/319,608

(22) Filed: Dec. 29, 2005

(51) Int. Cl.
*G06K 5/00* (2006.01)

(52) U.S. Cl. ........................ 235/380; 235/376; 235/377

(58) Field of Classification Search ......... 235/379–380; 705/35–45, 50–79
See application file for complete search history.

(56) References Cited

U.S. PATENT DOCUMENTS

| | | | | |
|---|---|---|---|---|
| 6,094,643 | A * | 7/2000 | Anderson et al. | 705/44 |
| 6,405,318 | B1 * | 6/2002 | Rowland | 726/22 |
| 7,058,597 | B1 * | 6/2006 | Ronning et al. | 705/26 |
| 7,497,374 | B2 * | 3/2009 | Helsper et al. | 235/380 |
| 2002/0082886 | A1 * | 6/2002 | Manganaris et al. | 705/7 |
| 2002/0133721 | A1 * | 9/2002 | Adjaoute | 713/201 |
| 2003/0097330 | A1 * | 5/2003 | Hillmer et al. | 705/38 |
| 2003/0208439 | A1 * | 11/2003 | Rast | 705/38 |
| 2004/0063424 | A1 * | 4/2004 | Silberstein et al. | 455/410 |
| 2004/0093316 | A1 * | 5/2004 | Howard et al. | 706/25 |
| 2004/0162781 | A1 * | 8/2004 | Searl et al. | 705/51 |
| 2004/0230530 | A1 * | 11/2004 | Searl et al. | 705/51 |
| 2006/0026102 | A1 * | 2/2006 | Ryan | 705/50 |
| 2006/0149674 | A1 * | 7/2006 | Cook et al. | 705/44 |
| 2006/0236395 | A1 * | 10/2006 | Barker et al. | 726/23 |

* cited by examiner

*Primary Examiner*—Thien Minh Le
*Assistant Examiner*—Christle I Marshall (57) ABSTRACT

A system and method for detecting transaction anomalies and information reflecting potential fraudulent activities is disclosed. Data is collected from transactions carried out in a number of business applications such as computer systems, telecommunication systems and security systems. This transaction data is normalized to generate transaction data having consistent format for analysis and/or comparison. User profiles are generated by sorting the normalized data by user and identifying particular user characteristics from the sorted data. Each user profile therefore reflects the behavior of the user as it relates to the business applications. The user profiles and/or predetermined rules are then used to detect anomalies in incoming transactions.

19 Claims, 6 Drawing Sheets

MULTIDIMENSIONAL TRANSACTION FRAUD DETECTION SYSTEM AND METHOD

BACKGROUND INFORMATION

Detection of anomalies in data is a core technology with broad applications: detection of cardiac arrhythmias in ECG data, discovering semiconductor defects from plasma-etch data, detecting network faults from traffic data, ascertaining user interface design defects from user data, etc. Over the last dozen years, another application has emerged: detection of unauthorized or malicious users on computer hosts and networks, often called intrusion detection.

Intrusion detection systems are usually based on logical or physical attacks on a network infrastructure. However, business transactions are also a source of intrusions, and these intrusions generally go unnoticed because of the lack of security features built into systems that support business transactions.

For example, computer applications are created having several layers with each layer including detective, preventive, and corrective controls. At the business transaction layer, the detective controls are usually limited to known business rules used for supervisory type reports. The prioritization and volume of these reports along with the high error rate associated with human review results in so-called "authorized fraud." Significant fraud, whether a "salami attack" (i.e., a series of small computer crimes—slices of a larger crime—that are difficult to detect and trace) or high dollar fraud, thus goes undetected until possible financial audits.

BRIEF DESCRIPTION OF THE DRAWINGS

The accompanying drawings are incorporated in and constitute a part of this specification.

DETAILED DESCRIPTION OF PREFERRED EMBODIMENTS

Methods, systems and articles of manufacture consistent with features and principles of the present invention facilitate the detection of potential fraud in transactions by combining anomaly detection, rule violation and pattern matching operations. A collection of application transactions resulting from using one or more systems determines business patterns or behavior of a user. These patterns are used to detect anomalies in the user's behavior, are compared to business rules for violations, and are compared to historical transaction patterns of the user or other users. When the information derived from these detection and comparison operations indicates potential fraud, a system monitor (for example, a person or another system) is alerted to the potential fraud.

Many applications have transaction trails, audit trails, and/or logs used to store information associated with transactions. In one preferred implementation consistent with the present invention, a system may use at least a portion of this information to form a data store for information on user behavior. The data store may store information particular to the behavior of individual users and/or information generally applicable to a set of users. The data store may be used to form (and include) rules for determining validity or appropriateness of user behavior (for example, certain transactions under specific conditions may be considered invalid). Alternatively, or additionally, these rules may be predetermined by a system operator.

The data store may be accessed when or nearly when a new transaction is detected by the system. Information indicative of this new transaction may be compared to the information in the data store to determine whether the new transaction is considered to be unusual for the particular user, i.e., an anomaly. If so, that information alone or in combination with information derived from additional transactions involving the same or a different user may initiate a trigger to alert a system monitor of a potential fraud.

Reference will now be made in detail to certain preferred exemplary embodiments implemented according to the invention, examples of which are illustrated in the accompanying drawings. Wherever possible, the same reference numbers will be used throughout the drawings to refer to the same or like parts.

Figure 1:
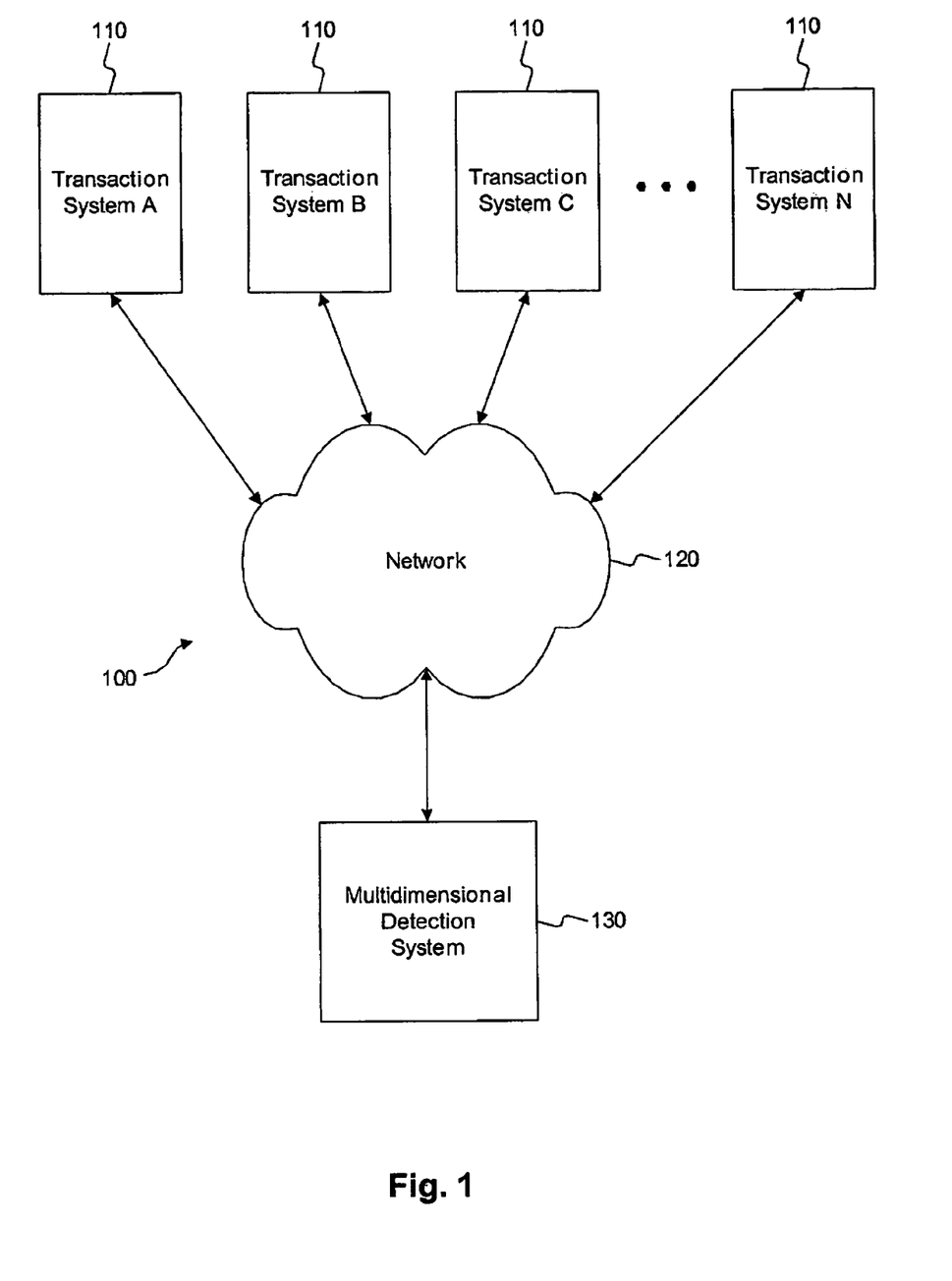
FIG. 1 is a block diagram of an environment in which methods and systems consistent with the present invention may be implemented.

FIG. 1 is a block diagram of an environment in which methods and systems consistent with the present invention may be implemented. The environment includes a plurality of transaction systems 110, network 120, and multidimensional detection system 130.

Transaction systems 110 include systems used to initiate and/or complete and record various transactions. According to one embodiment, transaction systems 110 include various business related transaction systems such as computer systems controlling customer accounts (e.g., telecommunication accounts and credit card accounts), computer systems controlling employee access to physical facilities (e.g., entry key systems, provisioning systems, and telephone systems) and computer systems controlling organization accounting (e.g., billing systems). Communication between transaction systems 110 and network 120 may utilize a wired connection, a wireless connection, or a combination of a wired and wireless connection. Those skilled in the art will appreciate various connections by themselves or in combinations may be used.

Network 120 generally provides an infrastructure for devices and systems to communicate data, voice, or a combination of data and voice. Such an infrastructure may support TCP/IP protocols as well as other known protocols for handling transmission of voice and/or data in a network. An existing infrastructure such as a Local Area Network (LAN), Wide Area Network (WAN), Public Switch Telephone Network (PSTN), or the Internet, may be used, in whole or in part, to form network 120.

Multidimensional detection system 130 facilitates the detection of potential fraud in transactions from the plurality of transaction systems 110 by combining anomaly detection, rule violation and pattern matching operations. According to one embodiment, a collection of transactions resulting from using one or more of transaction systems 110 determines business patterns or behavior of a user. These patterns are used to detect anomalies in the user's behavior, are compared to business rules for violations, and are compared to historical transaction patterns of the user or other users. When the information derived from these detection and comparison operations indicates potential fraud, multidimensional detection system 130 provides a potential fraud alert to a system monitor (for example a person or another system). Communication between multidimensional detection system 130 and network 120 may utilize a wired connection, a wireless connection, or a combination of a wired and wireless connection. Those skilled in the art will appreciate various connections by themselves or in combinations may be used.

Figure 2:
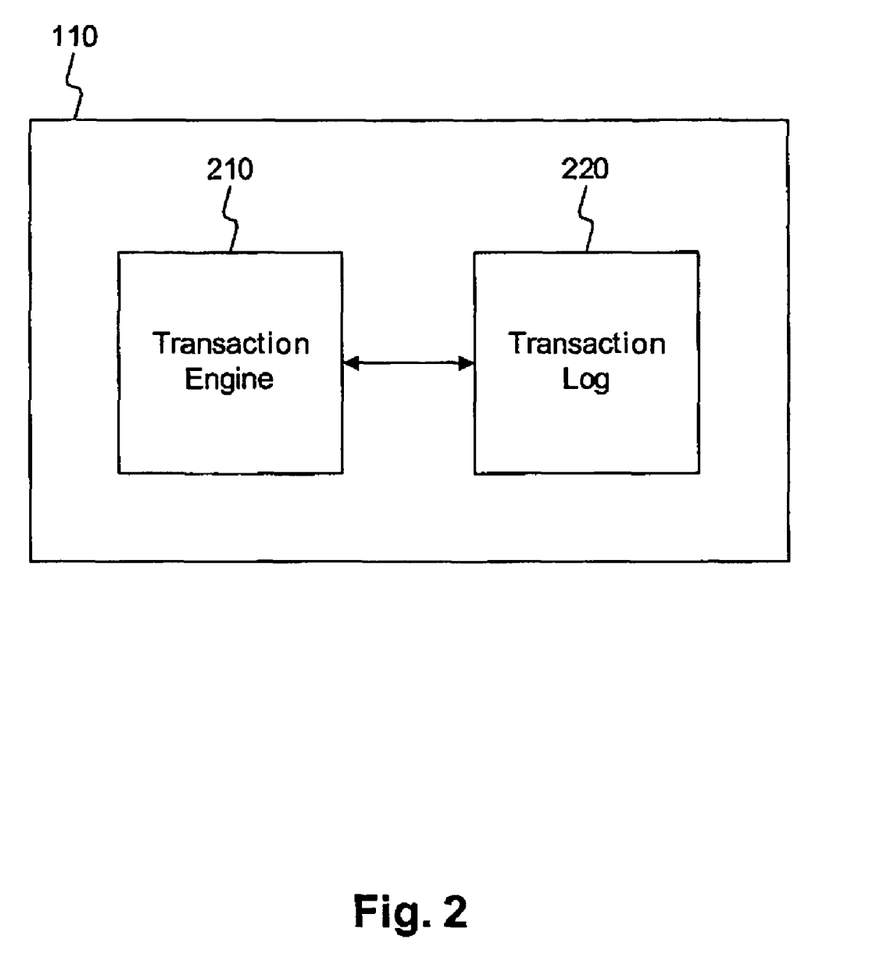
FIG. 2 is a block diagram illustrating components of an implementation of a transaction system consistent with certain aspects of the present invention.

FIG. 2 is block diagram illustrating components of an exemplary transaction system 110. Transaction system 110 includes transaction engine 210 and transaction log 220. These components are explained in more detail below.

Transaction engine 210 initiates and/or completes various transactions. In one embodiment, transaction engine 210 comprises a computer system configured to perform certain transactions under control of a user. Transaction engine 210 may include software, hardware, processing systems, memory, support systems, and any other elements that enable transaction engine 210 to perform transactions. One skilled in the art would realize that transaction engines 210 may include various configurations as required to perform certain transactions. For example, transaction engine 210 may include a billing system that enables a user to credit and debit customer accounts and generate customer bills. Transaction engine 210 may include a customer service computer system that enables a user to control service levels for individual customers (e.g., telephone service, cable television service, internet access). Transaction engine 210 may include a badge access system that enables a user to "badge in" and "badge out" of secure facilities. Transaction engine 210 may include a provisioning system that enables a user to grant and deny access to various enterprise level computers systems and other resources. Transaction engine 210 may include a network access system that enables a user to access certain network content as necessary. As will be apparent to one having skill in the art, the various transaction engines discussed are exemplary. Transaction engine 210 may include any computer system configured to perform transactions.

Transaction logs 220 provide a means or mechanism to collect data from business applications of interest. Transaction log 220 comprises, for example, one or more data loggers that record specific data at specific intervals. Transaction log 220 can be implemented using hardware, firmware, software or a combination thereof. According to one embodiment, transaction log 220 comprises software code that logs data and creates an audit trail for the corresponding transaction engine 210. As will be apparent to those having skill in the art, the appropriate implementation for transaction log 220 is based upon, for example, the transaction system 110 being monitored, the particular data of interest and the environment within which the monitoring is occurring.

According to one embodiment, transaction log 220 logs data regarding transactions of interest on respective transaction engine 210. For example, transaction log 220 may log the following data from transactions occurring on transaction engine 220: system user identification, PC IP address from which a transaction is completed, transaction description, transaction level (for example, a dollar amount), data fields modified by the transaction, identification of any device modified, transaction timing (input of data and output of any result). According to one embodiment, transaction logs 220 are employed to gather data from transaction engines including, without limitation, computer systems controlling customer accounts (e.g., telecommunication accounts and credit card accounts), computer systems controlling employee access to physical facilities (e.g., entry key systems, provisioning systems, and telephone systems) and computer systems controlling organization accounting (e.g., billing systems).

Transaction log 220 may be deployed to collect transaction data from a diverse array of business systems consistent with the teachings of the present invention. The data is then manipulated and used to detect anomalies and potential fraud by multidimensional detection system 130. Some exemplary deployments for transaction log 220 will help to illustrate. Transaction log 220 may be used to collect transaction data from a customer account management system. In such a deployment, transaction log 220 may collect data about transactions that change customer account parameters (for example, user ID, transaction amount, time of transaction, etc.). Transaction log 220 may be used to collect transaction data from a telephone system. In such a deployment, transaction log 220 may collect data about telephone calls made from an individual's telephone (for example, dialed numbers, duration of calls, time of calls, etc.). Transaction log 220 may be used to collect transaction data from facility security systems. In such a deployment, transaction log 220 may collect data relating to a user's building access (for example, user ID, time of building entry, time of building exit, doorways used, etc.). Transaction log 220 may be used to collect transaction data from enterprise computer networks. In such a deployment, transaction log 220 may collect data about an individual's computer network usage (for example, log-in time, log-out time, Internet accesses, etc.). It will be apparent to those having skill in the art that a vast array of deployments are possible and within the scope of the present invention.

Figure 3:
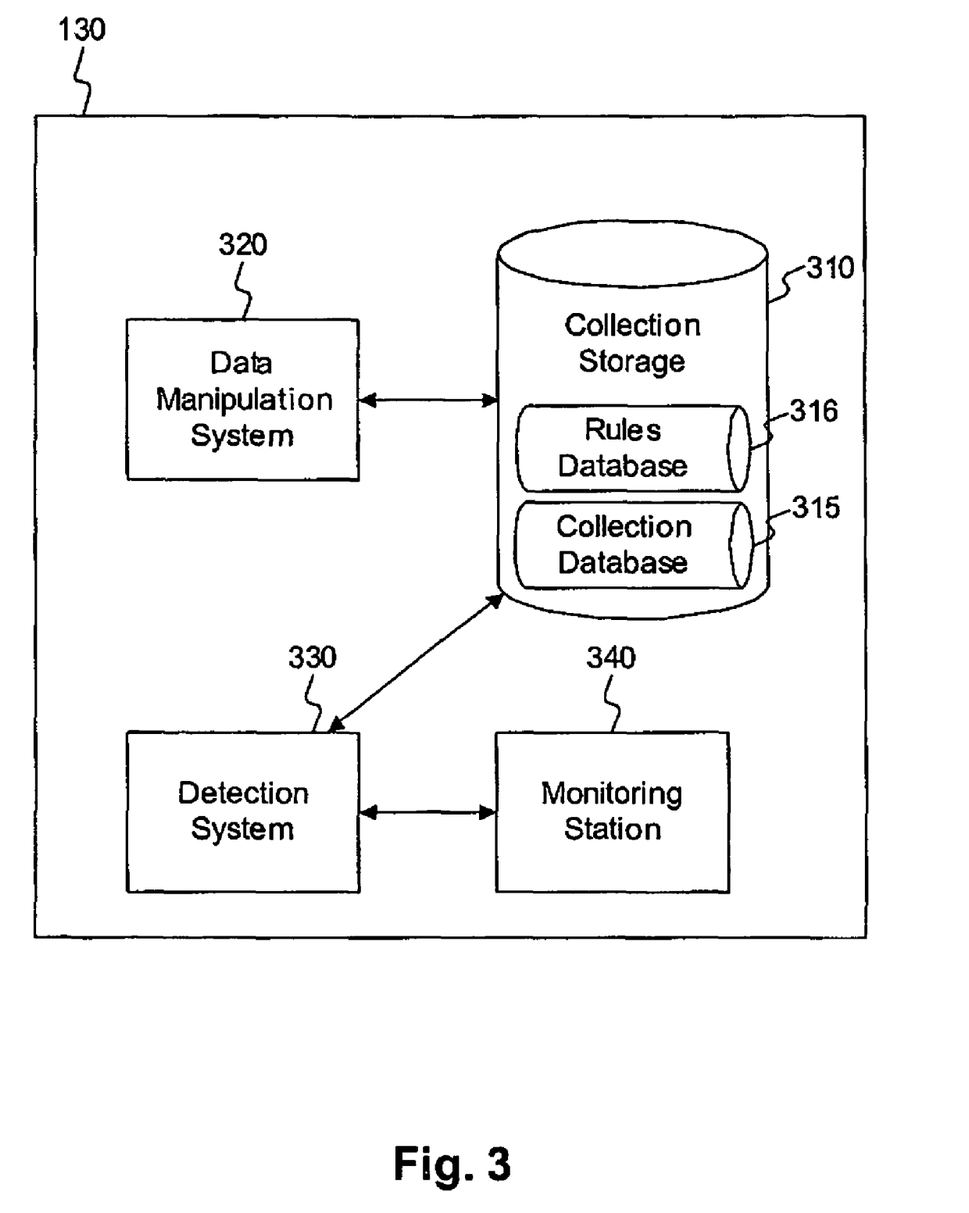
FIG. 3 is a block diagram illustrating components of an implementation of a multidimensional detection system consistent with certain aspects of the present invention.

FIG. 3 is block diagram illustrating components of an implementation of multidimensional detection system 130. Multidimensional detection system 130 comprises collection storage 310, data manipulation system 320, detection system 330 and monitoring station 340. The various components are explained in more detail below.

Collection storage 310, collection database 315 and rules database 316 together comprise the operational storage for multidimensional detection system 130. More specifically, collection storage 310, collection database 315 and rules database 316 are used to store data received from transaction logs 220, manipulated data derived from data received from transaction logs 220, and data used to evaluate data (e.g., patterns, rules, profiles etc.) received from transaction logs 220. The data received from transaction logs 220 is evaluated using anomaly detection, rule violation and pattern matching operations. A collection of application transaction data derived from transaction logs 220 and resulting from transactions taking place within transaction engines 210, determines business patterns or behavior of a user. These patterns are used to detect anomalies in the user's behavior, are compared to business rules for violations, and are compared to historical transaction patterns of the user or other users. According to one embodiment, this data is stored in collection database 315 and rules database 316 within collection storage 310.

In some embodiments according to the present invention, collection storage 310 comprises any commercially available mass storage medium. In a preferred embodiment, collection storage 310 comprises a hard disk drive with storage capacity suitable for storing operational data used to implement methods and systems consistent with the present invention. According to another embodiment, collection storage 310 comprises an optical disk drive with storage capacity suitable for storing operational data used to implement methods and systems consistent with the present invention. It will be apparent to those having skill in the art that other storage mediums may be used to implement collection storage 310.

In a preferred embodiment, collection database 315 and rules database 316 comprise any commercially available program suitable for organizing and providing access to operational data stored within collection storage 310. According to one embodiment, collection database 315 and rules database 316 comprise any commercially available relational database. It will be apparent to those having skill in the art that other databases (e.g., network, flat, and hierarchical databases) that provide suitably fast and flexible data access may be used to implement collection database 315 and rules database 316.

Data manipulation system 320 provides a means or mechanism to manipulate data formats. Data manipulation system 320 may include software, hardware, processing systems, memory, support systems, and any other elements that enable data manipulation system 320 to manipulate data. One skilled in the art would realize that data manipulation system 320 may include various configurations depending upon the data sources and the manipulation desired.

In one embodiment, data manipulation system 320 comprises a computer system configured to normalize data received from transaction logs 220. As an example of transaction data normalizing, consider that different business applications may record a user's identity in various ways. In order to aggregate user identity data, data manipulation system 320 normalizes the data to a consistent format. For example, data manipulation system 320 may normalize user identity data to a nine-digit identification number, e.g., social security number. Alternatively, data manipulation system 320 may normalize user identity to a consistent name format, e.g., last name, first name, middle initial. It will be apparent to those having skill in the art, that various normalizing techniques may be used to generate data having a consistent format.

Detection system 330 provides a means or mechanism to develop and apply patterns, rules, and user profiles from manipulated transaction data in order to detect anomalies. Detection system 330 may include software, hardware, processing systems, memory, support systems, and any other elements that enable detection system 330 to detect anomalies. One skilled in the art would realize that detection system 330 may include various configurations depending upon the data sources and the manipulation desired.

According to one embodiment, detection system 330 develops rules, patterns and user profiles that can be used to detect anomalies. For example, detection system 330 may determine a rule based upon the transaction times associated with a particular business application. More particularly, detection system 330 may determine from the normalized transaction records that a particular business application is used most heavily at certain times (e.g., Monday through Friday from 9:00 am to 5:00 pm). In such a case, detection system 330 may define a rule that "flags" transactions outside of the time range as potentially fraudulent. This type of rule may, of course, also take into account normal operating hours associated with the business system. According to another example, detection system may define a rule regarding usage of all business systems by a particular user. More specifically, detection system 330 may examine all transactions on all systems from a particular user to develop a rule that the particular user requests and completes all transactions, regardless of business application, within the hours of 3:00 pm to 1:00 am on Tuesdays through Saturday. Thus, detection system may flag future transactions from that user outside that time range as potentially fraudulent.

Detection system 330 may also determine patterns from normalized transaction data. For example, detection system 330 may develop a pattern to detect salami attacks by reviewing all transactions below a particular threshold from one or more users. More particularly, based on the normalized data, detection system 330 may determine that nearly all transactions within a particular business application exceed a particular threshold. As such, a pattern of a repeated number of transactions below the threshold amount may provide an indication of a salami attack.

Detection system 330 may also develop user profiles from the normalized transaction data. Detection system 330 may then use the user profiles to detect potentially fraudulent transactions. According to one embodiment, detection system 330 generates a user profile by sorting all transaction data generated by a particular user and determining characteristics particular to the user from the transaction data. For example, the normalized data, rules and patterns may indicate that a user typically works at a particular location (i.e., work location), using particular business applications, on accounts in a particular geographic area (i.e., transaction location), on transactions of a particular size or value (i.e., transaction size), between the hours of 8:00 am to 5:00 pm weekdays (working hours) and enters and leaves the work facilities four times each day. This data indicates a profile for the user such that transactions requested outside of the parameters of the profile (i.e., different timing, different work location, different account location) are potentially fraudulent. It will be apparent to those having skill in the art that detection system 330 may define a wide variety of rules, patterns and profiles.

Monitoring station 340 provides a monitoring station for potential fraud. Monitoring station 340 may include a personal computer, work station or any other suitable computing device. According to one embodiment, monitoring station 340 is configured to receive and display to a system monitor (e.g., a person) warning messages about potentially fraudulent transactions from detection system 330. The warning message may comprise, for example, an identification of the user, the type of transaction, the time of the transaction and the nature of the potential fraud. According to another embodiment, monitoring station 340 comprises an automated access control system that is configured to receive warning messages about potentially fraudulent transactions and restrict access to the appropriate user or users in response to the warning messages. It will be apparent to one having ordinary skill in the art that various warning messages and potential responses are possible.

Figure 4:
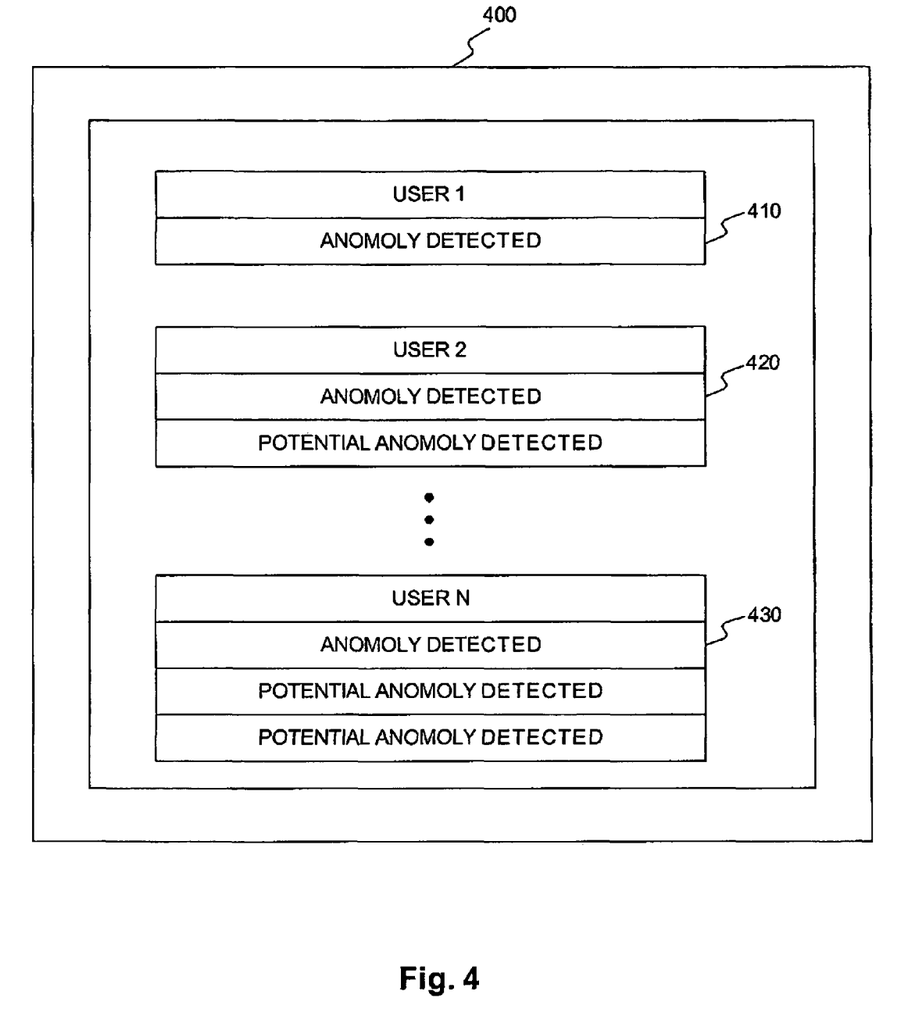
FIG. 4 is an anomaly detection display consistent with certain aspects of the present invention.

FIG. 4 is an exemplary display 400 for monitoring station 340. Display 400 comprises a number of warning messages 410-430. According to one embodiment, the warning messages 410-430 are organized by user. In FIG. 4, the warning messages comprise a user identification, a list of anomalies detected and a list of potential anomalies detected. It will be apparent to one having ordinary skill in the art that various configurations are possible for monitoring station 340 and the warning messages displayed thereon.

Figure 5:
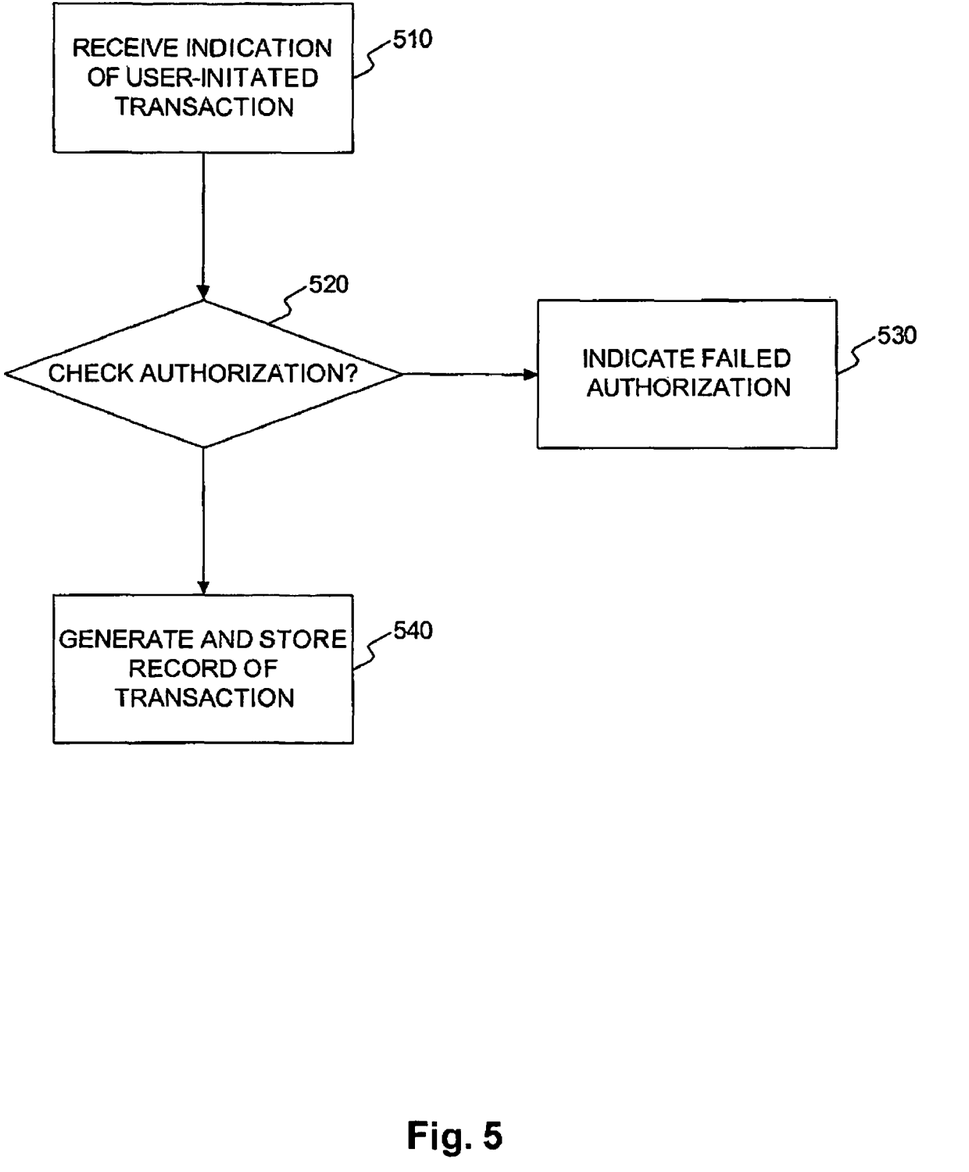
FIG. 5 is a flow chart used to explain the steps of an exemplary process for initially handling transactions.

The preferred embodiments according to the present invention utilize transaction data to develop patterns, rules and profiles for particular users. These patterns, rules and user profiles are then used to detect anomalies and therefore potential fraud in transactions. FIG. 5 is a flow chart used to explain the steps of an exemplary process for initially handling and collecting transaction data. As shown in FIG. 5, the process for handling transactions begins with receiving an indication of a user initiated transaction at step 510. Once an indication of a transaction is received, an authorization check is done at step 520. If the authorization check indicates that the transaction is unauthorized, the method provides an indication of failure at step 530. If the transaction is authorized, a record of the transaction is generated and stored at step 540. According to one embodiment, the method of FIG. 5 comprises an initial authorization check within one of transaction systems 110. For example, the method of FIG. 5 is used as an initial authorization check within, for example, computer systems controlling customer accounts (e.g., telecommunication accounts and credit card accounts), computer systems controlling employee access to physical facilities and computer systems controlling organization accounting.

The multidimensional transaction anomaly detection method of FIG. 5 begins with receipt of an indication of a user initiated transaction at step 510. According to one embodiment, an indication of a user initiated transaction is generated automatically by one of transaction systems 110 when a user initiated transaction is started. The indication is used to indicate an incoming transaction. According to another embodiment, such a transaction indication is also communicated through network 120 to multidimensional detection system 130.

Once an indication of a user initiated transaction is received, an authorization check is done at 520. According to one embodiment, the authorization check of step 520 comprises an authorization and/or authentication check by the transaction system 110 within which the transaction was requested. According to another embodiment, the authorization check comprises one or more checks to determine, for example, if the user requesting the transaction is authorized to use the transaction system 110 or if the amount of the transaction exceeds any system or user-specific limits. For example, the user authentication may comprise a userID/password check. It will be apparent to those skilled in the art that various forms of authorization checks may be employed.

A transaction record is generated and stored for authorized transactions at step 540. When it is determined that a transaction is authorized, a transaction record is generated and stored for the transaction. According to one embodiment, the transaction record is generated by transaction engine 210, stored in transaction log 220 and comprises data sufficient to identify the transaction and the user. According to another embodiment, the transaction record comprises, for example, the following information: user identification; time of the transaction; date of the transaction; description of the transaction; size or value of the transaction; and, changes made by the transaction. It will be apparent to those having skill in the art that other data elements may be included in the transaction record.

Figure 6A:
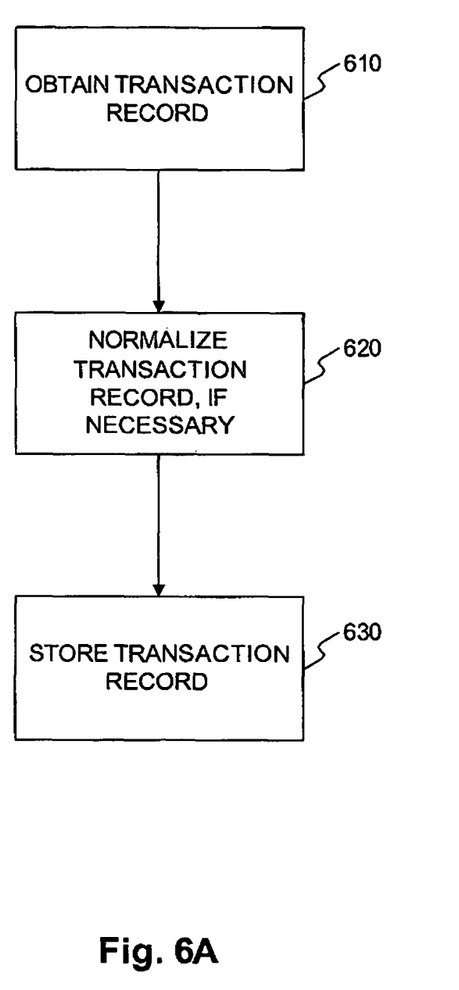
FIGS. 6A and 6B are flow charts used to explain the steps of exemplary processes for recording and combining information for transactions and for detecting potential fraud.
Figure 6B:
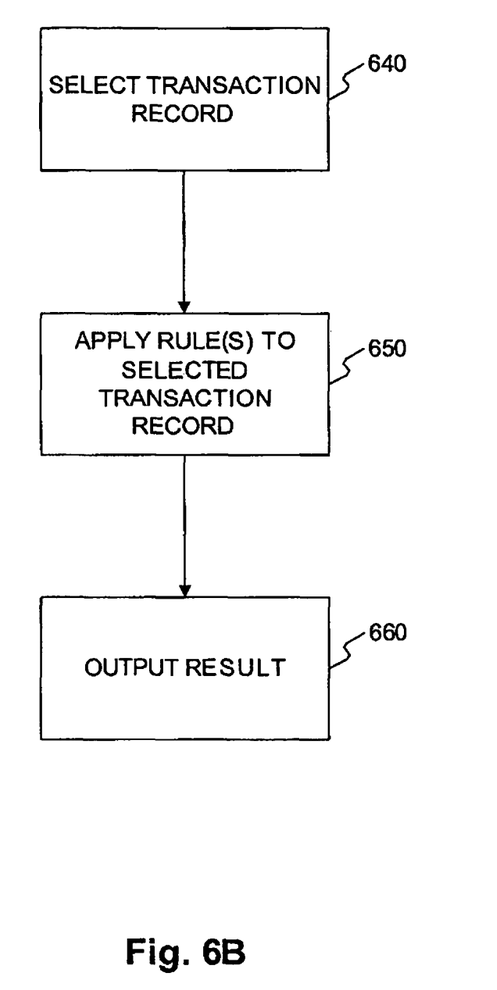

FIGS. 6A and 6B are flow charts of exemplary processes for recording and combining information for transactions and for detecting potential fraud. More particularly, FIG. 6A depicts the steps of a preferred process for collecting and normalizing transaction records. FIG. 6B depicts the steps of a preferred process for detecting potential fraud.

FIG. 6A depicts a process for collecting and normalizing transaction records used in conjunction with a multidimensional anomaly detection method according to one embodiment of the present invention. According to FIG. 6A, the method for collecting and normalizing transaction records comprises obtaining transaction records (step 610), normalizing transaction records (step 620) and storing normalized transaction records (step 630).

In step 610, transaction records are obtained. According to one embodiment, transaction records are generated by transaction systems 110 and automatically communicated through network 120 to multidimensional detection system 130. More particularly, transaction records are generated and stored in transaction systems 110, communicated through network 120 to multidimensional detection system 130 where they are stored within collection storage 310.

Transaction data from a diverse range of business applications is combined together and used to detect potential anomalies in transactions. Although business applications capture certain transaction data for audit purposes, the data captured by different applications/systems may have different formats. Therefore, transaction records received are normalized to a consistent format if necessary (step 620). Referring to the system of FIGS. 1-3, according to one embodiment, data manipulation system 320 normalizes transaction data.

As an example of transaction data normalizing, consider that different business applications may record a user's identity in various ways. In step 620, therefore, user identity data is normalized to a consistent format. According to one embodiment, user identity is normalized to a nine-digit identification number, e.g., social security number. According to another embodiment, user identity is normalized to a consistent name format, e.g., last name, first name, middle initial. It will be apparent to those having skill in the art, that various normalizing techniques may be used to generate data having a consistent format.

At step 630, normalized transaction records are stored. According to one embodiment, normalized transaction data is stored within a database and is used to develop rules, patterns and user profiles for anomaly detection. With reference to the system of FIGS. 1-3, and according to one embodiment, normalized transaction data is stored within collection database 315. It will be apparent to those having ordinary skill in the art that other storage options are possible.

According to one embodiment of the present invention, the normalized transaction data is used to develop rules, patterns and user profiles that can be used to detect anomalies. For example, a rule may be determined based upon the transaction times associated with a particular business application. More particularly, it may be determined from the normalized transaction records that a particular business application is used most heavily at certain times (e.g., Monday through Friday from 9:00 am to 5:00 pm). In such a case, a rule may be defined that "flags" transactions outside of the time range as potentially fraudulent. This type of rule may, of course, also take into account normal operating hours associated with the business system. According to another example, the normalized transaction data may be used to define a rule regarding usage of all business systems by a particular user. More specifically, all transactions on all systems from a particular user may be examined to develop a rule that the particular user requests and completes all transactions, regardless of business application, within the hours of 3:00 pm to 1:00 am on Tuesdays through Saturday. Thus, transactions from that user outside that time range may be flagged as potentially fraudulent.

The normalized transaction data may also be used to determine patterns. For example, all transactions below a particular threshold from one or more users may be used to develop a pattern to detect salami attacks. More particularly, the normalized data may be used to determine that nearly all transactions within a particular business application exceed a particular threshold. As such, a pattern of a repeated number of transactions below the threshold amount may provide an indication of a salami attack.

According to one embodiment, the normalized data, patterns and rules may be used to develop user profiles. The user profiles may be used to detect potentially fraudulent transactions. According to one embodiment, a user profile is generated by sorting all transaction data generated by a particular user and determining characteristics particular to the user from the transaction data. For example, the normalized data, rules and patterns may indicate that a user typically works on accounts in one particular geographic area, between the hours of 8:00 am to 5:00 pm weekdays and enters and leaves the work facilities four times each day. This data indicates a profile for the user such that transactions requested outside of the profile are potentially fraudulent. According to one embodiment, the rules, patterns and profiles developed are stored in rules database 316. It will be apparent to those having skill in the art that a wide variety of rules, patterns and profiles may be defined consistent with the teachings of the present invention.

FIG. 6B depicts a process for detecting potential fraud consistent with one embodiment of the present invention. As shown, the method for detecting comprises selecting a transaction record at step 640, applying defined rules to the selected transaction record at step 650 and outputting a result of the rules application at step 660.

At step 640, a transaction record is selected for examination. According to one embodiment, every incoming normalized transaction record is selected for examination at step 640. According to an alternative embodiment, transaction records are sampled at a frequency sufficient to detect most fraudulent transactions. In such a case, it may be determined that examining every transaction is unnecessarily burdensome. In yet another embodiment, all transactions from a particular individual are selected at step 640. It will be apparent to those having skill in the art that other methods of selecting a transaction are within the spirit and scope of the present invention.

The rules are applied to the selected transaction record to determine potentially fraudulent transactions at step 650. According to one embodiment, all available rules are applied to the selected transaction record at step 650. According to another embodiment, when there exists a particular fraud threat (for example, dictated by recent transaction history), only rules particular to detecting that threat are applied at step 650. Other rule application methods are appropriate and within the scope of the present invention.

According to one embodiment, the rules are applied using a scoring methodology. For example, when a rule is applied, conventional pattern matching methodology may be employed to develop a score. The score may represent, for example, a percent confidence that the rule has been violated. Additionally, a threshold may be applied such that all percentages exceeding the threshold are considered the result of an anomalous transaction. As will be apparent to one having skill in the art, scoring methodologies are well known and various scoring methodologies could be employed.

At step 660, a result of the rule application is output. According to one embodiment, the result comprises an indication of a potential fraud displayed on a monitor of a system administrator. Such an output allows a system administrator to further examine the potentially fraudulent transaction immediately so that ongoing fraud may be prevented. The system administrator may also examine other relevant transactions (e.g., other transactions from the same user or other transaction from the same business system) for fraud. According to another embodiment, the result comprises an indication of potential fraud that is sent via email to a system administrator. It will be apparent to those having skill in the art that various methods of display may be used by themselves or in combination.

The above-noted features and other aspects and principles of the preferred embodiment according to the present invention may be implemented in various environments. Such environments and related applications may be specially constructed for performing the various processes and operations described herein or they may include a general purpose computer or computing platform selectively activated or reconfigured by program code to provide the necessary functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and techniques.

The present invention may also be implemented using computer processor readable media that include program instruction or program code for performing various computer-implemented operations based on the methods and processes consistent with the invention. The program instructions may be those specially designed and constructed for the purposes of the invention, or they may be of the kind well-known and available to those having skill in the computer software arts. Examples of program instructions include for example machine code, such as produced by a compiler, and files containing a high level code that can be executed by the computer using an interpreter.

Variations of the methods and systems consistent with features of the present invention may be implemented without departing from the scope of the invention. Accordingly, the invention is not limited to the above described embodiments, but instead is defined by the appended claims in light of their full scope of equivalents.

What is claimed is:

1. A fraud detection method performed by a computer having a processor, comprising:
   collecting, by the processor, a plurality of transaction records containing transaction information about transactions performed by an individual across different business applications, the transaction information having different formats;
   normalizing, by the processor, the transaction information to a consistent format;
   determining, by the processor and based on the normalized transaction information, a transaction rule defining a characteristic of a typical transaction by the individual general to all the business applications;
   generating, by the processor and based on the normalized transaction information, a user profile for the individual, the user profile including the transaction rule;
   receiving, by the processor, information about new transactions associated with the individual in the different business applications;
   determining, by the processor and based on the new transaction information, characteristics of the new transactions;
   comparing, by the processor, the characteristics of the new transactions to the transaction rule;
   determining, by the processor and based on the comparison, whether the new transactions constitute an anomaly for the individual; and
   sending an alert based on a result of the determination.

2. The method of claim 1, wherein sending the alert comprises sending an indication of potentially fraudulent activity.

3. The method of claim 2, further comprising when an anomaly is determined, sending a signal to a device to provide notice of the anomaly.

4. The method of claim 1, wherein sending the alert comprises transmitting a signal to a device when it is determined that a value associated with the anomaly is equal to or greater than a threshold value.

5. The method of claim 1, wherein the profile includes information developed over a period of time from the different business applications and reflecting past behavior of the individual.

6. A method performed by a computer having a processor, the method comprising:
   collecting, by the processor, a plurality of transaction records containing transaction data for transactions performed by an individual across different business applications, the transaction data having different formats;
   normalizing, by the processor, the transaction data to a consistent format;
   determining, by the processor and based on the normalized transaction data, a transaction rule defining a characteristic of a typical transaction by the individual general to all the business applications;
   generating, by the processor and based on the normalized transaction data, a user profile including the transaction rule;
   receiving, by the processor, data about new transactions associated with the individual in the different business applications;
   determining, by the processor and based on the new transaction data, characteristics of the new transactions;
   comparing, by the processor, the characteristics of the new transactions to the transaction rule;
   detecting, by the processor, whether the new transactions constitute an anomaly based on the comparison; and
   sending, by the processor, an alert when an anomaly is detected.

7. The method of claim 6, wherein the transaction data comprises information identifying a user of a business application for a transaction.

8. The method of claim 6, wherein the transaction data comprises information concerning a time of a transaction.

9. The method of claim 6, wherein the transaction data comprises information concerning a size of a transaction.

10. The method of claim 6, wherein the transaction data comprises information concerning a location of a user of business application for a transaction.

11. The method of claim 6, wherein the transaction data comprises information concerning a location related to a transaction.

12. The method of claim 6, wherein the characteristic of a typical transaction by the individual comprises one or more of:
    a typical transaction timing for the individual;
    a typical transaction size for the individual;
    most commonly used business applications of the individual;
    typical working hours for the individual;
    a typical work location for the individual; and
    a typical transaction location for the individual.

13. The method of claim 12, wherein the characteristic of a typical transaction by the individual provide an indication of the individual's behavior.

14. The method of claim 6, wherein detecting an anomaly comprises:
    comparing the characteristics of the new transactions with the user profile; and
    identifying a transaction anomaly associated with the individual based on the comparison.

15. A system comprising:
    a database storing a plurality of transaction records containing transaction data for transactions performed by an individual across a plurality of different business applications, the transaction data having different formats; and
    a processor configured to:
      receive the transaction records from the database;
      normalize the transaction data to a consistent format;
      determine, based on the normalized transaction data, a transaction rule defining a characteristic of a typical transaction by the individual general to all the business applications;
      generate, based on the normalized transaction data, a user profile including the transaction rule;
      receive data about new transactions associated with the individual in the different business applications;
      determine, based on the new transaction data, characteristics of the new transactions;
      compare the characteristics of the new transactions to the transaction rule;
      detect whether the new transactions constitute an anomaly for the individual based on the comparison; and
      provide an alert when an anomaly is detected.

16. The system of claim 15, wherein the transaction information includes information identifying a user of a business application for a transaction and information concerning a time of the transaction.

17. The system of claim 15, wherein the characteristic of a typical transaction by the individual comprises one or more of:
    a typical transaction timing for the individual;
    a typical transaction size for the individual;
    most commonly used business applications of the individual;
    typical working hours for the individual;
    a typical work location for the individual; and
    a typical transaction location for the individual.

18. The system of claim 15, wherein the characteristic of a typical transaction by the individual provides an indication of the individual's behavior.

19. The system of claim 15, wherein the processor is further configured to:
    compare the characteristics of the new transactions with the user profile; and
    identify a transaction anomaly associated with the individual based on the results of the comparison.

* * * * *